United States Patent [19]

Okino et al.

[11] Patent Number: 4,956,715
[45] Date of Patent: Sep. 11, 1990

[54] IMAGE SENSING DEVICE HAVING A PHOTOMETRIC ELEMENT FOR SETTING AN EXPOSURE CONDITION FOR THE IMAGE SENSING DEVICE

[75] Inventors: Tadashi Okino; Nobuaki Date; Nobuo Tezuka; Syuichiro Saito, all of Kanagawa, Japan

[73] Assignee: Canon Kabushiki Kaisha, Tokyo, Japan

[21] Appl. No.: 409,283

[22] Filed: Sep. 19, 1989

Related U.S. Application Data

[63] Continuation of Ser. No. 169,074, Mar. 16, 1988, abandoned, which is a continuation of Ser. No. 726,097, Apr. 23, 1985, abandoned.

[30] Foreign Application Priority Data

Apr. 24, 1984 [JP] Japan .................................. 59-82605

[51] Int. Cl.$^5$ .............................................. H04N 3/19
[52] U.S. Cl. .................................. 358/213.19; 358/228
[58] Field of Search .................. 358/909, 228, 213.13; 354/431, 432, 402

[56] References Cited

U.S. PATENT DOCUMENTS 3,934,161 1/1976 Caywood ........................ 358/213.19
4,427,996 1/1984 Tamura ................................ 358/228
4,523,101 6/1985 Tsunekawa ........................ 354/402

Primary Examiner—Stephen Brinich
Attorney, Agent, or Firm—Toren, McGeady & Associates

[57] ABSTRACT

An image sensing device includes an image sensor; a photometric element which is arranged separate from the image sensor to measure light with a diaphragm aperture fully opened; a storing time control circuit arranged to variably control the storing time of the image sensor; a circuit arranged to form exposure control information from the output of the image sensor on the basis of the output of the photometric element at least under a condition in which the storing time is controlled by the storing time control circuit; and an exposure control circuit arranged to control the exposed condition of the image sensor on the basis of the exposure control information.

25 Claims, 4 Drawing Sheets

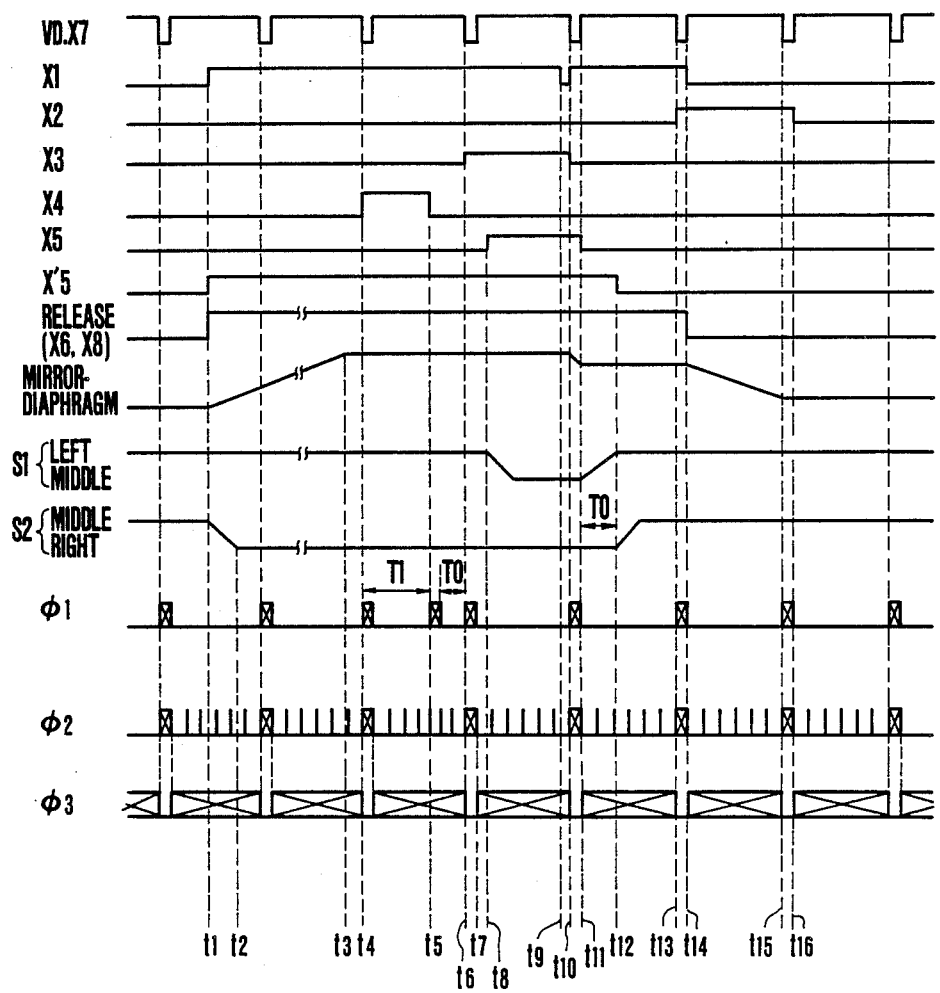

IMAGE SENSING DEVICE HAVING A PHOTOMETRIC ELEMENT FOR SETTING AN EXPOSURE CONDITION FOR THE IMAGE SENSING DEVICE

This is a continuation application of Ser. No. 07/169,074, filed Mar. 16, 1988 now abandoned, which in turn is a continuation application of Ser. No. 06/726,097 now abandoned, filed Apr. 23, 1985.

BACKGROUND OF THE INVENTION

1. Field of the Invention

This invention relates to an image sensing device which permits highly accurate exposure control.

2. Description of the Prior Art

Heretofore, a device of this kind has been required to have an extremely high exposure control accuracy in taking a still picture of an object to be photographed since the response range of the image sensor is extremely narrow. Meanwhile, where an optical view finder of the TTL (through the lens) type is employed in the device of this kind, the diaphragm aperture of the device is preferably left in a full open state until immediately before photographing for the purpose of having a bright image plane within the view finder. Therefore, with the aperture in a full open state, light measurement is performed by means of a photometric element which is arranged separate from the image sensor and which has a wider dynamic range than the image sensor; and exposure control is performed on the basis of a photometric data thus obtained, so that exposure control can be quickly carried out after the start of photographing.

However, the photometric information thus obtained with the maximum aperture differs from photometric information obtained with the diaphragm aperture stopped down to a value used for actual photographing. It has been ascertained that this discrepancy in the photometric information is not ignorable in the case of an image sensor of a narrow dynamic range.

Furthermore, to solve the problem of the error or discrepancy between the photometic data obtained with the maximum aperture and the photometric data obtained with an actual stopped down aperture, it is conceivable to obtain accurate exposure data by driving the diaphragm and a shutter to have their values actually used immediately before an actual photo-taking operation. However, such an arrangement results in an extremely poor response which often causes the photographer to miss a desired shutter opportunity.

This invention is directed to the solution of the problems presented by the prior art devices. It is, therefore, an object of this invention to provide an image sensing device and an exposure control method, wherein exposure control may be accomplished with a high degree of accuracy by operating an image sensor under substantially the same exposure condition as the condition under which photographing is to be performed with the length of preparation time required for photographing shortened to a minimal time.

The above and further objects and features of this invention will become apparent from the following detailed description of a preferred embodiment thereof taken in conjunction with the accompanying drawings.

Summary of the Invention

To attain the object of the invention, an embodiment of this invention is arranged to obtain a first exposure control information by means of a photo-sensitive element which is separate from an image sensor while the storing time of the image sensor is under control; the exposure of the image sensor is controlled on the basis of the first exposure control information; and a second exposure control information is formed from an image sensing signal thus obtained. Therefore, although the diaphragm aperture is held in a full open state for an optical view finder before photography, a still picture recording can be promptly carried out and the exposure condition can be simply, quickly and accurately performed.

BRIEF DESCRIPTION OF THE DRAWINGS

FIG. 3 is a timing chart.

Figure 1:
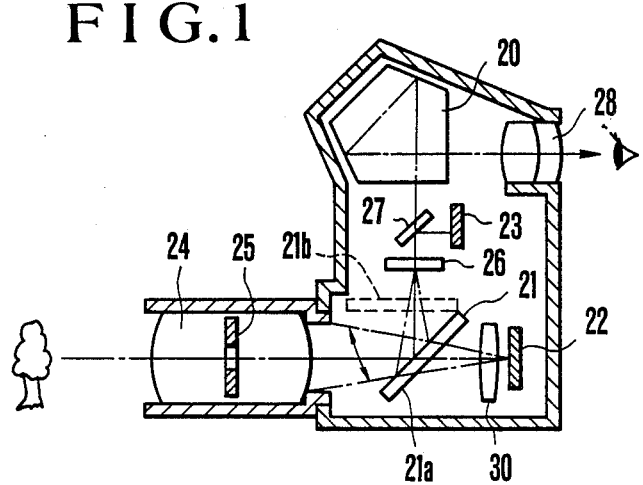
FIG. 1 is a sectional view showing the structural arrangement of an image sensing device in an embodiment of this invention.

DETAILED DESCRIPTION OF THE PREFERRED EMBODIMENT:

FIG. 1 shows, in a sectional view, the mechanical arrangement of an image sensing device embodying this invention. The illustration includes a turnable mirror 21; an image sensor 22 such as a CCD; and a photometric element 23 such as a silicon photo-cell (SPC) having corrected spectral luminous efficacy. When the mirror 21 is in a lowered position 21a, the optical path of the device is as follows: A light flux, which has passed through a photo-taking lens 24 and a diaphragm aperture 25, is imaged on a focusing glass 26 by the mirror 21. The optical image thus obtained passes through a half-mirror 27, a pentagonal prism 20 and an eye piece 28 to permit visual observation through a view finder part. Meanwhile, a portion of the light flux reflected by the halfmirror 27 reaches to the photometric element 23.

When the mirror 21 is in an up-lifted position 21b, 100 percent of the light flux, which has passed through the photo-taking lens 24 and the aperture 25, reaches the image sensor 22, if it is not blocked by a shutter 30. The shutter 30 is a focal plane shutter consisting of blades S1 and S2, as will be further described later herein.

Figure 2B:
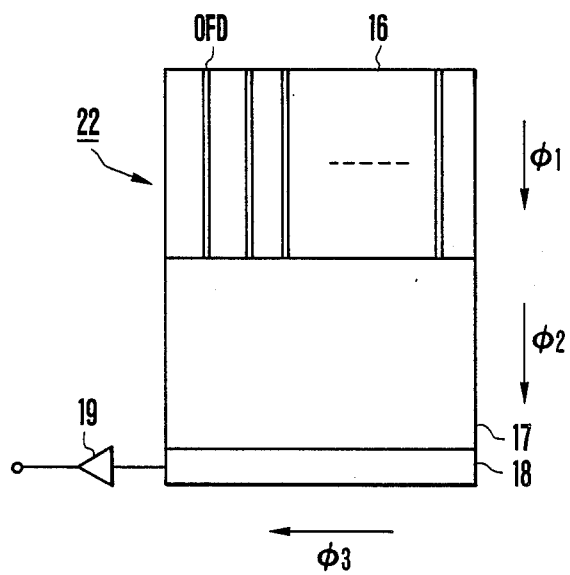
FIG. 2B is an illustration showing, by way of example, an image sensor.
Figure 2A:
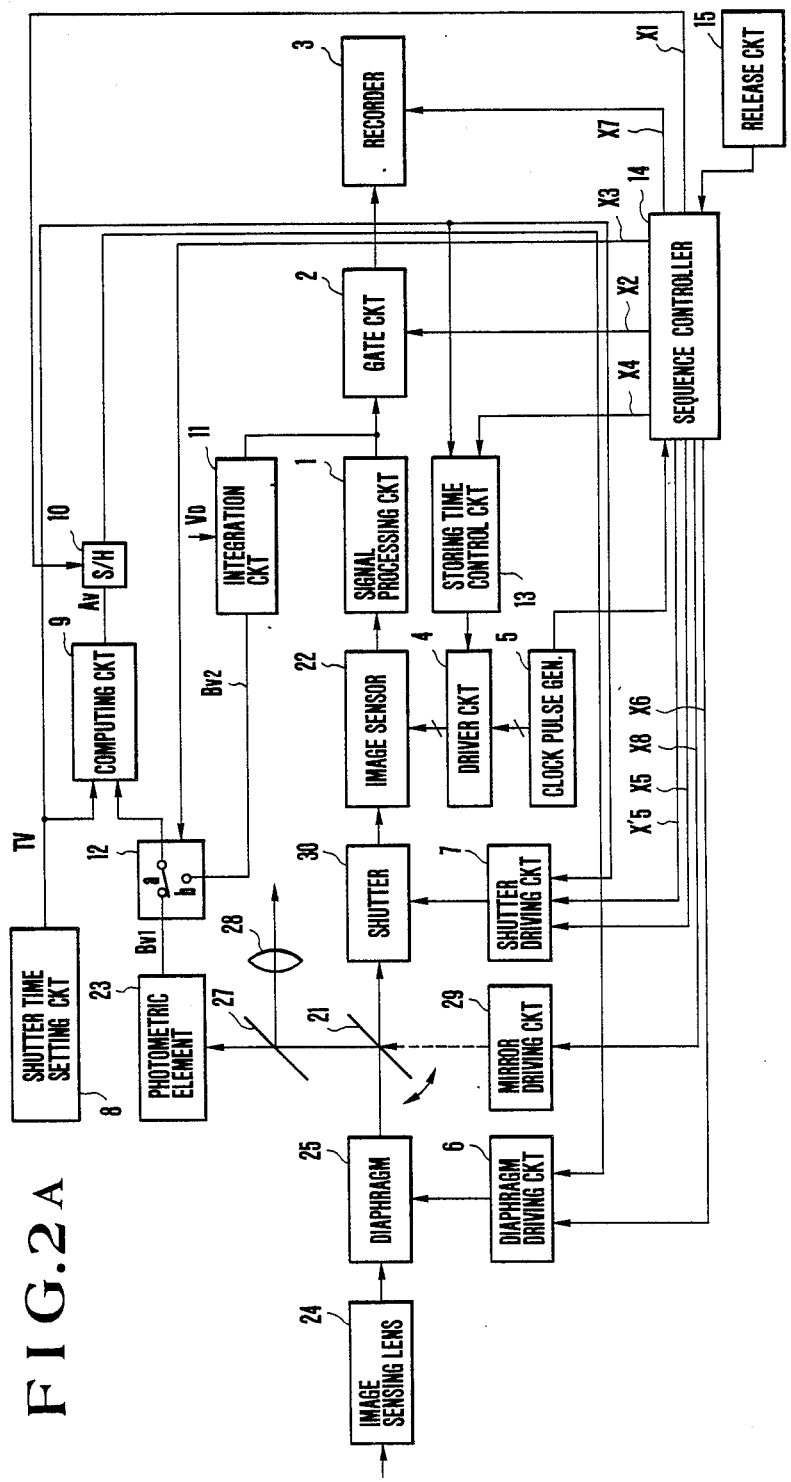
FIG. 2A is a circuit diagram showing the electric circuit blocks of the embodiment shown in FIG. 1.

FIG. 2A is a block diagram showing, by way of example, the electrical circuit arrangement of the image sensing device embodying this invention. The same reference numerals as those used in FIG. 1 denote the same component elements. A signal processing circuit 1 is arranged to perform various correcting operations on luminance and chrominance components of a signal produced from the image sensor 22. Reference numerals 2 and 3, respectively, denote a gate circuit and a recorder. The gate circuit 2 is arranged to have the open period and the operation timing thereof controlled by a control output X2 of a sequence controller 14. A driver circuit 4 is arranged to drive the image sensor 22. A clock pulse generator 5 is arranged to provide the driver circuit 4 with varied timing signals and also to form a vertical synchronizing signal. A diaphragm driving circuit 6 is arranged to control the operation and the aperture value of the diaphragm in accordance with an output X6 of the sequence controller 14 and the output of a sample-and-hold circuit 10. A shutter driving circuit 7 is arranged to control the operation and exposure time based on outputs X5 and X'5 of the sequence controller 14 and the output of a shutter time setting circuit 8. The shutter driving circuit 7 and the diaphragm driving circuit 6 form exposure control means. The operation of the shutter blades S1 and S2 is under the control of the outputs X5 and X'5 of the sequence controller 14. The shutter time setting circuit 8 consists of a manually operated dial, etc., and is arranged to designate a shutter time value Tv of the shutter 30. A computing circuit 9 is arranged to produce aperture information values Av1 and Av2 by selectively computing the shutter time Tv and luminance information Bv1 produced from the photometric element 23 or an output Bv2 of an integration circuit 11. The sample-and-hold circuit 10 serves as storage means for storing the computation outputs Av1 and Av2 of the computing circuit 9 by sampling them at a timing defined by a control output X1 of the sequence controller 14. The integration circuit 11 is arranged to form exposure control information by integrating, for one vertical period, a luminance signal which is suitably formed by the signal processing circuit 1. A switch circuit 12 is arranged to selectively supply the output Bv1 of the photometric element 23 or the output Bv2 of the integration circuit 11 to the computing circuit 9. When a control output X3 of the sequence controller 14 is at a low level, the switch circuit 12 is connected to one side "a" thereof, and to another side "b" when the output X3 is at a high level. A storing time control circuit 13 is arranged to serve as storing time control means and operates under the control of the sequence controller 14. The storing time of the image sensor 22 is controlled by the control circuit 13 with the pulses which are supplied to the image sensor 22 controlled based on to the output of the shutter time setting circuit 8.

The sequence controller 14 is arranged to receive the output of a release circuit 15, which forms a release signal, and the output of the clock pulse generator 5 which forms a synchronizing signal. The controller 14 produces control outputs X1-X8 which are shown in FIG. 3.

A mirror driving circuit 29 is arranged to control the position of the mirror 21 in accordance with the output X8 of the sequence controller 14.

FIG. 2B shows, by way of example, the details of the image sensor 22, which is a frame transfer type CCD in this specific embodiment. Referring to FIG. 2B, the illustration includes a light receiving part 16, a storage part 17, a horizontal shift register 18 and an output amplifier 19. The image sensor 22 is provided with an overflow drain OFD, which may be arranged in the same manner as the one disclosed, for example, in Japanese Patent Publication No. SHO 51-22356. In other words, the overflow drain OFD is arranged via a predetermined potential barrier between the vertical shift registers which form the light receiving part 16.

Shift pulses $\phi 1$ and $\phi 2$ are arranged to vertically transfer the electric charges of the light receiving part 16 and the storage part 17. A shift pulse $\phi 3$ is arranged to horizontally transfer the electric charge which has been vertically transferred from the storage part 17, one line of the storage part 17 at a time. Next, the embodiment which is arranged as shown in FIGS. 2A and 2B operates as described below with reference to FIGS. 3 and 4A-4D:

FIG. 3 is a timing chart. FIGS. 4A-4D show the image sensor 22 in relation to the movement of the shutter blades S1 and S2, as viewed from the side of the lens.

Figure 4A:
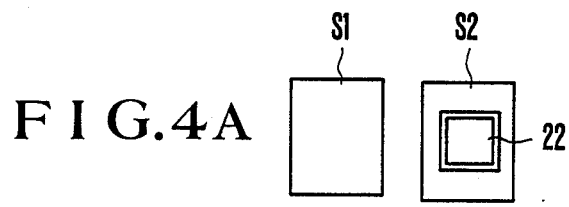
FIGS. 4A–4D are illustrations showing the image sensor in relation to shutter blades.

The release signal is at a low level when a power supply switch (not shown) is off. Under this condition, the outputs X6 and X8 of the sequence controller 14 are at low levels. With the output X6 at the low level, the diaphragm driving circuit 6 causes the diaphragm to be full open. With the output X8 at the low level, the mirror driving circuit 29 has the mirror 21 in the lowered position 21a as shown in FIG. 1. Furthermore, under this condition, the outputs X5 and X'5 are at low levels to have the blades S1 and S2 in left and middle positions respectively, as shown in FIG. 4A. Accordingly, the image sensor 22 is in a light shielded state with the shutter blades S1, S2 in these positions.

When the power supply switch (not shown) is turned on, the photometric computing circuit 9 begins to operate. The value Bv1 of the light quantity incident on the photometric element 23 and the shutter time value Tv, which is preset by means of a dial or the like, are computed to obtain, through an APEX computation, the aperture value Av1 which is necessary for obtaining an apposite exposure condition. Furthermore, the aperture value Av continuously varies based on the light quantity incident on the photometric element 23 up to a point of time t1 at which time a release signal is obtained from the release circuit 15.

Furthermore, after the power supply switch is turned on, the clock pulse generator 5 produces a vertical synchronizing signal VD, etc. The outputs of the generator 5 are supplied to the sequence controller 14, etc. By this, the operations of the whole image sensing device are synchronously controlled.

Figure 4B:
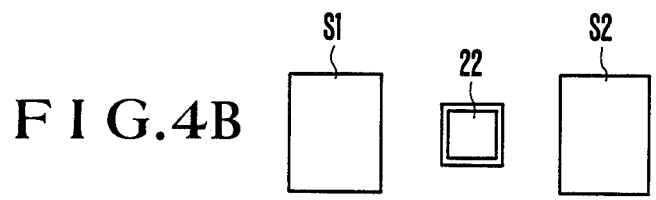

Then, the shift pulses $\phi 1$ - $\phi 3$ are supplied, as shown in FIG. 3, to have an image, which is formed at the image sensor 22, read out based on to the standard television period. After that, when the release switch, etc., are turned on at the point of time t1, the release signal being formed at the release circuit 15. Then, the outputs X6 and X8 become high levels. The output X1 also becomes a high level. As a result, the sample-and-hold circuit 10 holds the aperture value Av obtained at the point of time t1. The diaphragm driving circuit 6 then stops down the aperture of the diaphragm 25 to bring the aperture to the value Av1, which is the aperture value Av at that time. Furthermore, the mirror driving circuit 29 causes the mirror 21 to move to the up-lifted position 21b of FIG. 1. Meanwhile, in response to the release signal, the output X5 becomes a high level to cause the shutter blade S2 to begin to move toward a right position as shown in FIG. 4B. When the movement to the right position of the shutter blade S2 is completed at a point of time t2, the image sensor 22 is no longer shielded from light. With time having lapsed to another point of time t3, the diaphragm aperture 25 completely reaches the aperture value Av1 and the mirror 21 is brought fully into the up-lifted state 21b. The output X4 becomes a high level at a point of time t4 in synchronization with another vertical synchronizing signal VD produced after the aperture control completion point of time t3. After the point of time t4, the storing time control circuit 13 produces a pulse at a point of time t5 after the lapse of time $Tl = Ts - \frac{1}{2}^{Tv}$ (wherein Ts: 1 vertical period)

which corresponds to the shutter time value Tv set by the shutter time setting circuit 8. Following this, the shift pulses ∅1 are supplied in a greater number than the number of lines of the light receiving part 16 and at a high speed.

By this, the electric charge within the light receiving part 16 is collected in an area close to a border line between the light receiving part 16 and the storage part 17. The collected electric charge then overflows there and is discharged into the overflow drain OFD. At that time, a several line portion of the overflowing electric charge flows into the storage part 17. However, the amount is negligible.

Therefore, the image information accumulated at the light receiving part 16 during a period of time To from completion of vertical transfer after the point of time t5 to a next vertical transfer point of time t6 is produced from the output amplifier 19 during one field period between the points of time t6 and t10, as shown in FIG. 3. There is obtained the following relation: $To \approx V2^{Tv}$.

Furthermore, during this period, the integration circuit 11 performs integration for every field and is reset by the rise of the signal VD.

Since the output X3 is at a high level during a period between the points of time t6 and t10, the switch circuit 12 is shifted to the side "b" thereof. The computing circuit 9 computes an integration output Bv2, integrated during the period from the point of time t6 to the time point t10 to obtain the new aperture value Av2. The sample-and-hold circuit 10 then holds this value Av2 when the level of the output X1 becomes low at a point of time t9 immediately before the point of time t9.

Accordingly, the diaphragm driving circuit 6 adjusts the value Av of the diaphragm aperture to the value Av2. In other words, the aperture is corrected by producing the aperture value Av2 obtained at the point of time t10 in place of the aperture value Av1 which is based on the light measurement (photometric) value Bv1 obtained at the point of time t1.

According to the invention, extremely accurate exposure control information can thus be obtained. It is another advantage that accurate exposure control information is obtainable by a simple arrangement without performing exposure control by actually driving the shutter 30.

Figure 4C:
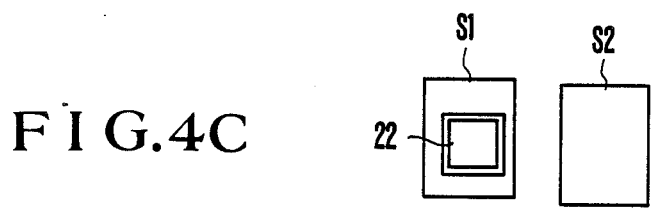

Furthermore, at a point of time t8 immediately after completion of the vertical transfer between the time points t6 and t7, the level of the output X5 becomes high to bring the shutter blade S1 into the middle position, as shown in FIG. 4C.

Figure 4D:
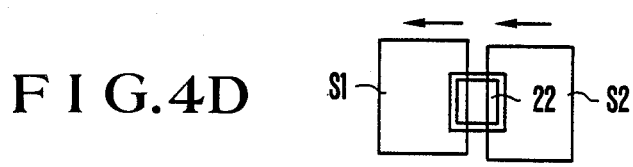

Accordingly, the image sensor 22 is again shielded from light. Therefore, no smearing takes place at this point of time. Next, upon completion of vertical transfer between time points t10 and t11, the level of the output X5 becomes low. The blade S1 begins again to move toward the left position. An exposure thus begins. Then, at a point of time t12 after the lapse of the period of time To which corresponds to the shutter time value Tv set by the shutter time setting circuit 8, the level of the output X'5 becomes low to allow the shutter blade S2 to begin to move toward the middle position thereof. In other words, as shown in FIG. 4D, the shutter blade S2 begins to shield the image sensor 22 from light delaying as much as the period of time To from the other shutter blade S1. The exposure is thus carried out for the period of time To. Furthermore, at a point of time t14, the levels of the outputs X1, X6 and X8 become low. Therefore, the mirror 21 resumes the lowered position 21a. The diaphragm aperture returns to a full open state.

The image sensor 22 is still shielded from light during vertical transfer during a period between the time points t13 and t14. Therefore, no smearing takes place during this period. Meanwhile, during a period between the time points t11 and t12, the diaphragm aperture is stopped down according to the aperture value Av2. During the subsequent period from the time point t13 to the time point t14, the image condition which is thus acurately exposure controlled is vertically transferred to the storage part 17. The image is then read out by means of the shift pulses ∅2 and ∅3 during an ensuing period between the time points t14 and t15.

The level of the output X2 is high during a period from the point of time t13 to a point of time t16. During this period, the gate circuit 2 is open to permit a signal, which is read out from the image sensor 22 and is processed by the signal processing circuit 1, to be recorded by the recorder 3.

In the specific embodiment described, an SPC is employed as the photometric element 23. However, the invention is not limited to the use of the SPC. Furthermore, the storing time is controlled by converging the electric charge at one part within the light receiving surface to allow it to overflow and by discharging it into the drain OFD. However, this arrangement may be replaced with another arrangement in which, for example, each of the picture elements of the light receiving surface 16 is provided with a drain via a gate and the storing time is variably controlled by adjusting a timing at which these gates are opened or closed. Such a method for variably controlling the storing time is, for example, disclosed in U.S. Pat. No. 3,944,816.

Furthermore, the image sensor 22 is assumed to be a frame transfer type CCD for the sake of description. However, the CCD, of course, may be replaced with some other element capable of performing the same function.

Furthermore, in the specific embodiment described, the aperture is adjusted or corrected on the basis of exposure information obtained with the storing time being controlled. However, it is, of course, possible to adjust the shutter speed instead of the aperture.

It is also possible to have both the shutter speed and the aperture value adjusted or corrected.

What is claimed is:

1. An image sensing device comprising:
   (a) image sensing means;
   (b) a photometric element;
   (c) accumulating time control means for variably controlling the storing time of said image sensing means;
   (d) exposure information forming means for forming first exposure control information based on an output of said photometric element, and for forming second exposure control information based on an output of said image sensing means, under a condition in which the accumulating time is controlled by said accumulating time control means; and
   (e) exposure control means for correcting the exposure condition of said image sensing means on the basis of said second exposure control information, said exposure control means having a lower responsiveness than said accumulating time control means.

2. A device according to claim 1, wherein said accumulating time control means is provided to control the accumulating time by clearing an image sensing signal in said image sensing means at a predetermined timing.

3. A device according to claim 1, said exposure control means comprising stop means for controlling the quantity of light incident upon said image sensing means.

4. A device according to claim 3, wherein said photometric element is disposed behind said stop means.

5. A device according to claim 1, said exposure control means comprising shutter means for variably controlling the incident time of light incident on said image sensing means.

6. A device according to claim 5, wherein said light incident time controlled by said shutter means nearly corresponds to said accumulating time.

7. An image sensing device according to claim 1, and further comprising recording means for recording an output of said image sensing means which is formed under a condition in which said exposure control means corrects the exposure condition of said image sensing means.

8. An exposure controlling method for a still video camera comprising:
(a) a first step of forming first exposure control information for an object to be photographed, said information being formed based on light measuring means which is provided in addition to image sensing means;
(b) a second step of controlling an aperture value of an iris based on said first exposure control information, under a condition in which the accumulating time of said image sensing means is also controlled based on said first exposure control information;
(c) a third step of forming second exposure control information for correcting said first exposure information based on an image sensing signal formed by said image sensing means at said second step; and
(d) a fourth step of controlling the level of subsequent image sensing signals formed by said image sensing means based on the second exposure control information formed at the second step.

9. A method according to claim 8, wherein, at said fourth step, the quantity of light incident upon said image sensing means is controlled on the basis of said corrected first exposure control information.

10. A method according to claim 8, wherein, at said fourth step, at least the incident time of the light incident upon said image sensing means is controlled based on said corrected first exposure control information.

11. An exposure controlling method according to claim 8, and further comprising a step of recording and image sensing signal formed by said image sensing means during said fourth step.

12. An image sensing device for a still video camera comprising:
(a) stop means for controlling the quantity of light incident;
(b) image sensing means for forming an image sensing signal from light incident through said stop means;
(c) light measuring means other than said image sensing means for detecting the luminance of an object to be photographed;
(d) accumulating time control means for controlling the accumulating time of said image sensing means;
(e) control means for controlling said stop means;
(f) exposure control information forming means for forming light metering information based on said image sensing signal, under a condition in which the accumulating time is controlled by said accumulating time control means, and in which said stop means is controlled by said control means according to an output of said light measuring means; and
(g) level control means for controlling the level of subsequent image sensing signal formed in said image means according to said light metering information.

13. An image sensing device according to claim 12, said exposure control means comprising correcting means for correcting said stop means on the basis of said light metering information.

14. An image sensing device according to claim 12, and further comprising recording means for recording an image sensing signal which is level controlled by said level control means.

15. An image sensing device for a still video camera, comprising:
(a) image sensing means for generating an image signal; and
(b) exposure control means for controlling light incident to said image sensing means, comprising:
(1) a shutter member located in front of said image sensing means;
(2) presetting means for presetting an exposure time of said shutter member; and
(3) control means for accumulating the image signal in the image sensing means for a period of time corresponding to the exposure time preset by said presetting means, and for correcting said preset exposure time based on said image signal, and for controlling said shutter member so as to subsequently expose said image sensing means for said corrected preset exposure time.

16. A device according to claim 15, wherein said shutter member includes a shutter blade.

17. A device according to claim 15, wherein said presetting means includes manual setting means.

18. A device according to claim 15, wherein said presetting means further includes light metering means, and controls said exposure time by using a light metering information of said light metering means.

19. A device according to claim 15, wherein said exposure control means further includes a diaphragm.

20. A device according to claim 19, which further comprises recording means for recording the image signal whose exposure time is controlled by the control means.

21. An image sensing and recording device for a still video camera, comprising:
(a) image sensing means for generating an image signal and having variable accumulating time;
(b) a trigger member;
(c) a diaphragm for adjusting an amount of light incident on said image sensing means;
(d) a shutter located in front of said image sensing means which controls a time of incidence of light on said image sensing means;
(e) indication means for indicating a time value for the light incidence by said shutter and an aperture value for said diaphragm;
(f) control means for setting said diaphragm to the aperture value corresponding to the indication of said indication means by an operation of said trigger member, and for driving said image sensing means instead of said shutter to store the image signal for the time indication by said indication means to obtain a first image signal;

(g) shutter driving means for causing the light incidence, in accordance to the first image signal, to form a second image signal for said image sensing means for a predetermined shutter time; and (h) recording means for recording the second image signal as a still image.

22. A device according to claim 21, wherein said setting means includes manual setting means.

23. A device according to claim 21, wherein said presetting means further includes light metering means, and controls said predetermined time value based on a light metering information of said light metering means.

24. An image sensing device for a still video camera, comprising:

(a) image sensing means for generating an image signal, said image sensing means variably controlling the accumulating time;

(b) a trigger member;

(c) a diaphragm for adjusting an amount of light incident on said image sensing means;

(d) a shutter located in front of said image sensing means which controls a time of incidence of light on said image sensing means;

(e) control means for forming a first image signal in response to said triggering means to drive said diaphragm and said image sensing means to obtain a predetermined aperture value and a predetermined accumulating time, respectively, then correcting said predetermined accumulating time based on said first image signal and successively forming a second image signal by driving said shutter in accordance with the first image signal to effect incidence of light on said image sensing means for a predetermined time; and (f) recording means for recording the second image signal.

25. A device according to claim 24, wherein the diaphragm maintains a full-open state until said trigger member operates.

* * * * *